United States Patent [19]

Pilipski

[11] 4,176,617
[45] Dec. 4, 1979

[54] LOW PRESSURE ALARM

[76] Inventor: Mark Pilipski, 89 Mountainside Ter., Clifton, N.J. 07013

[21] Appl. No.: 889,484

[22] Filed: Mar. 23, 1978

[51] Int. Cl.² .................... F16K 37/00; G08B 3/06
[52] U.S. Cl. ................... 116/70; 128/202.22; 137/557
[58] Field of Search ............ 116/70; 137/557; 128/142 R

[56] References Cited

U.S. PATENT DOCUMENTS

| | | | |
|---|---|---|---|
| 3,611,981 | 10/1971 | Warncke | 116/70 |
| 3,682,129 | 8/1972 | Philbrick | 157/557 X |
| 3,785,333 | 1/1974 | Warncke et al. | 137/557 X |
| 3,901,178 | 8/1975 | Bermel | 116/70 |

Primary Examiner—Daniel M. Yasich

[57] ABSTRACT

An alarm system to monitor pressure in tubes or containers that normally maintain (a) a constant pressure, i.e., a fixed pressure or a pressure of some steady or unchanging magnitude, (b) a periodic pressure, i.e., a pressure which oscillates with a regular interval a recognizable period or a pressure, the magnitude of which varies from some positive value to a value close to or less than zero and then returns to its original positive value in some regular interval of time, (c) or a fluctuating pressure, i.e., a pressure similar to a periodic pressure but differing by not having any fixed period of time for an oscillation; a pressure which shifts from positive to negative uncertainly, is described. This alarm system sets an audible or other signal should pressure in a monitored line fall for a longer than acceptable period.

5 Claims, 1 Drawing Figure

U.S. Patent
Dec. 4, 1979
4,176,617
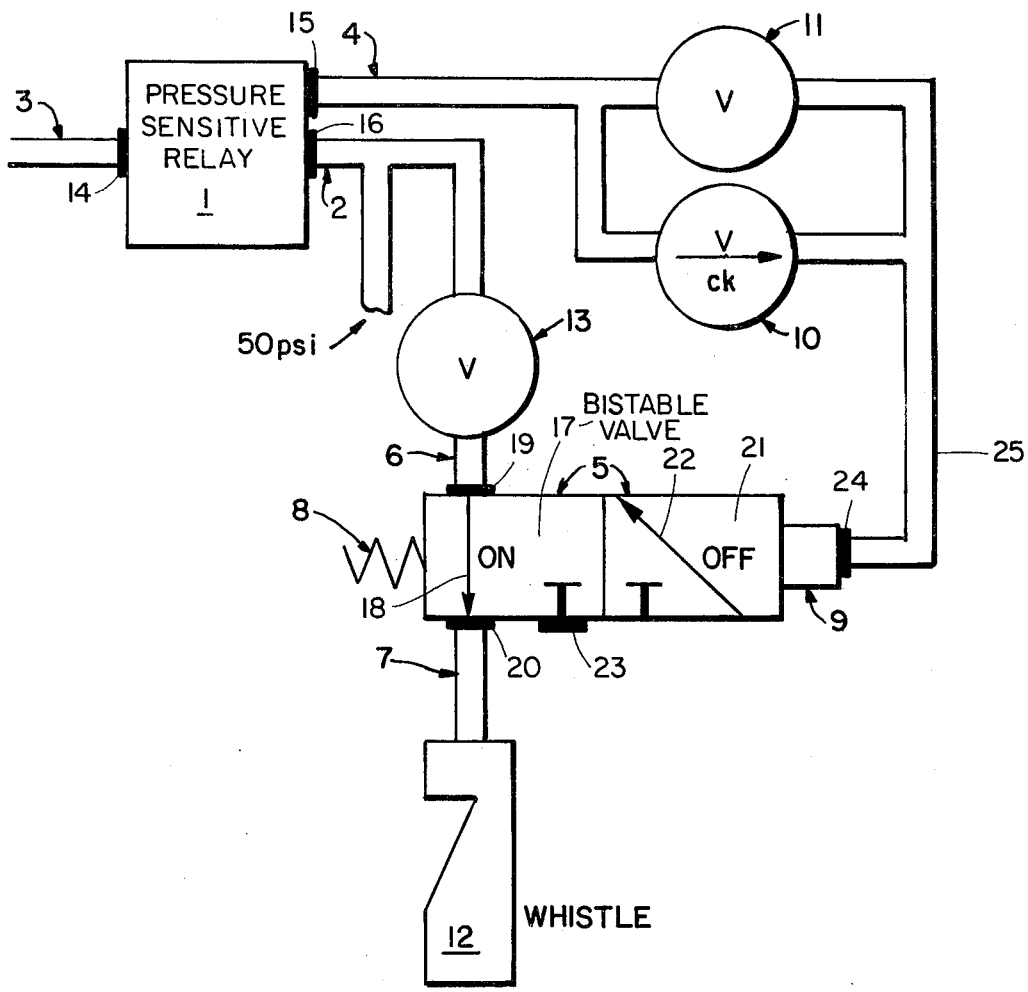

LOW PRESSURE ALARM

SUMMARY

This invention relates to a machine. Many devices and machines, such as ventilator devices, used to aid respiration, require for their normal and proper operation one or several tubes or containers (I shall refer to these as lines) to maintain, sometimes periodically, a low (less than 50 cmH$_2$O or approximately 1/10 pound/sq.cm.) pressure. Depending upon the function of these machines, their lines may be filled with gases, such as oxygen, nitrogen, chlorine, or any gaseous substance, or they may be filled with fluids, such as oils, water, solvents, or any fluid substance. The proper operation of such devices may require that these low pressure lines maintain their pressure periodically, constantly, or in a fluctuating fashion. The interuption of the pressure in these lines (for example, by breakage or disconnection of a line, or by leakage from the line, or a failure of some other portion of the device which is responsible for providing pressure to the line) for an extended (beyond normal operation) period of time may cause a failure in the operation of the device relying upon the pressure in these lines. To avert a breakdown of operation, an alarm system should be affixed to the line, said alarm system would monitor the pressure within the line to warn if there should occur any abnormal discontinuation of pressure within the line. Alarm devices such as those disclosed in U.S. Pat. No. 3,785,333 and U.S. Pat. No. 3,611,981 operate in response to pressures several thousand times greater than the pressures which require monitoring in sophisticated medical and/or industrial machinery and devices. Other known alarm systems such as is disclosed in U.S. Pat. No. 3,901,178 operate in response to pressures several hundred times greater than the low pressures mentioned above. These known devices also do not permit the synchronization of alarm function with a periodic pressure wave, thus they do not permit the monitoring of a normally periodic or fluctuating pressure. A disadvantage of known alarm systems is that they do not function equally well with gas or liquid substances. Those that can be made to function equally well with gas or liquid substances are complex in their nature. A further disadvantage of the prior art is that these alarm systems do not set an alarm signal to correlate with the actual drop in monitored pressure. That is, some systems set a single short alarm signal others set a continuous alarm signal but none will set an alarm signal which will sound until the monitored pressure is returned to a normal value and then silence the alarm signal.

Another disadvantage of known alarm systems is that they require for their proper operation that the substance being monitored also be vented, in some instances during the sounding of an alarm signal and in other instances when an alarm signal is not being produced.

Another disadvantage of known alarm systems is that they may require sensing means and alarm means of differing natures, i.e. one mechanical the other electrical, etc. Problems exist in conjunction with the state of the art for alarms of the type mentioned above. Commonly, low pressure signals in lines are converted to electrical analogs and then these electrical signals are manipulated in such a fashion to produce an alarm signal (audio or visual) if the line pressure is below normal or off for an abnormally long period. Such alarm systems require an electric energy source (battery or outlet type) which may be disadvantageous for use. If used in medical devices this type of electrical alarm might introduce an electrical hazard, unless completely sealed from the line, patient, or operator utilizing the medical device. If used to detect loss of pressure in a line conveying flammable or explosive gases or fluids, an electrical alarm may present a fire hazard. The coupling of an electrical alarm device to a pneumatic or hydraulic line requires an electrical system which may fail and, thus, not report the failure of the pneumatic or hydraulic system. My invention, A LOW PRESSURE ALARM, eliminates or reduces these problems. Accordingly, it is an object of my invention to provide an alarm device which does not have the disadvantages of prior known devices, and is simple in design and less likely to fail to function properly.

BRIEF DESCRIPTION OF DRAWING

The drawing is a schematic representation of the low pressure alarm showing the relationship of lines and components.

DESCRIPTION

The construction and operation of my invention is as follows; (please refer to the drawing): The gas or liquid filled line to be monitored, labelled 3 on the drawing, is connected to a pressure sensitive relay or similar device such as is described by U.S. Pat. No. 3,576,131. This relay, labelled 1 on the drawing, has three ports, labelled 14, 15, and 16 on the drawing, to which lines may be connected or attached; a supply port, labelled 16 on the drawing, powers the relay and requires a pressure of at least 50 psi, this 50 psi pressure that powers the relay is also called the first pressure source (most pneumatic and hydraulic devices used in industry today utilize such pressures for operating lower pressure lines); a sensing port, labelled 14 on the drawing, which is to be connected to the pressure within the line to be monitored, labelled 3 on the drawing, (this may be pneumatic or hydraulic pressure). This pressure to be monitored is also called the second pressure source, the last port on the relay is the output port, labelled 15 on the drawing. The relay functions in a manner such that when a pressure of more than approximately 1 cmH$_2$O (0.0142 psi) is applied to the sensing port 14, the output port 15 pressure is 50 psi. If the sensing port 14 pressure is below approximately 1 cmH$_2$O, then the output port 15 pressure is zero or a negative value. The output pressure, that is the presure at port 15 and hence line 4, on the drawing, of the relay powers a bistable valve, or similar device as is described by U.S. Pat. No. 3,766,935 and/or U.S. Pat. No. 3,786,831 and/or U.S. Pat. No. 3,819,152. This valve, labelled 5 on the drawing is schematically shown as including a first valving block 17 having an internal passage 18 for establishing communication between ports 19 and 20 and a second valving block 21 having an internal passage 22 for establishing communication between ports 19 and 23. The two valving blocks are normally biased by a coil spring 8 to positions such that port 23 is normally closed and port 20 is normally open with port 19 designated as a common port. The valve mechanism of valve 5 is moved from its normal position to an actuated position by any suitable means, such as a piston and/or diaphragm operator in an actuating chamber or pilot 9 which has a port 24. The states of this valve are such that the "ON" state allows gas or fluid flow between two ports labelled 19 and 20 on the drawing. This valve is pushed from the "OFF" state to the "ON" state by a spring, labelled 8 on the drawing. Thus, the valve, 5 on the drawing, may be considered normally on or normally open. The port 24 is connected to a pilot 9. A pressure of approximately 50 psi applied to port 24 and hence to the pilot 9 will push valve 5 to the "OFF" state, so that no flow can occur between ports 19 and 20. If the pressure at the pilot is relieved, the spring 8 will return the valve 5 to the "ON" state. The pressure applied to the pilot 9 is provided by the output of the relay 1 at port 15 through line 4 through a oneway check valve 10 on through line 25 to port 24. Pressure at the pilot 9 is relieved through line 25 through an adjustable needle valve or variable resistance, labelled 11 on the drawing. A whistle or some such sound or signal producer, labelled 12 on the drawing, is connected via line 17 to port 20. A fixed or variable resistance or valve, labelled 13 on the drawing, placed between the supply pressure source (50 psi) and the signal producer i.e. whistle 12 controls the audibility or magnitude of the signal. On the drawing valve 13 is placed between the pressure source (50 psi) and line 6 connected to port 19, thus through the internal passage 18 through port 20 through line 7, the valve 13 is connected to the whistle 12.

Thus, while a pressure is present in line 3 and communicated to port 14 of the pressure sensitive relay 1, the relay 1 acts to maintain a pressure approximately equal to the source pressure (50 psi) at port 15 and so on by connection to line 4. The bulk of this pressure in line 4 is communicated to port 24 of the bistable valve 5 through the check valve 10 and line 25. The pressure at port 24, now approximately equal to the source pressure, causes the pilot 9 to push the mechanism of valve 5 to an "OFF" state such that there is no communication between port 19 and port 20. A loss of pressure in line 3 and thus at port 14 of the relay 1 causes the relay to output a zero or negative pressure at port 15. This change in pressure at port 15 is communicated to line 4. This reduction of pressure in line 4 creates a pressure difference between line 4 and line 25. The substance, gas or liquid, which is creating the pressure in line 25 will flow from line 25 through valve 11 to line 4. Adjustment of valve 11 will permit this flow from line 25 to line 4 to be rapid or slow. Thus, the time required for the pressure in line 25 to be bled off through valve 11 may be fixed at any value by the adjustment of valve 11. When the pressure in line 25 and hence at port 24 becomes sufficiently low the force of the spring 8 overcomes the force of the pilot 9 and valve 5 is pushed to the "ON" state such that there is an internal passage 18 which allows communication between ports 19 and 20. Upon the opening of a passage between ports 19 and 20, the source pressure in line 2 may communicate through valve 13 through line 6 to port 19 and on to port 20 through passage 18. Pressure at port 20 and hence line 7 causes the signal producing element, in this example the whistle 12 to operate. This alarm signal will continue to sound until the pressure in line 3 is returned to normal and the subsequent rise of pressure in line 4 through check valve 10 through line 25 to port 24 causes the pilot 9 to push valve 5 to an "OFF" position as described.

This description of the preferred embodiment of my invention should be recognised by the reader as one of many modifications and forms of the above system.

I claim:

1. A device comprising
   a first pressure source,
   a second pressure source, said second pressure source being a monitored pressure,
   a pressure sensitive relay means, said relay means having at least a first port, a second port, and a third port, said first port connected to the first pressure source, and said second port connected to the second pressure source, said pressure sensitive relay means having an output means which emits an output pressure in response to the second pressure source applied to said second port, said output pressure being either a pressure approximately equal to the first pressure source or a zero or negative pressure; if the monitored pressure is positive, then the output pressure of the pressure sensitive relay means is approximately equal to the pressure of the first pressure source, if the monitored pressure approaches zero or a negative value, then the output pressure of the pressure sensitive relay means will be zero or a negative value, said output pressure is emitted from the said third port,
   a bistable valve means, normally biased to an unactuated state, said bistable valve means functionally consisting of a pilot means for actuating said bistable valve means and a means for establishing, when unactuated, an internal passage between at least two ports said internal passage of said parts constituting a fourth port and fifth port, said bistable valve means may be actuated by a pressure, approximately equal to the first pressure source, applied to said pilot means, said pilot means is connected to the output means of the pressure sensitive relay means through
   a first valving means, said first valving means functions to direct and control the flow of any fluent substance, gas or liquid to and from the said output means of the pressure sensitive relay means and the said pilot means of the bistable valve means,
   a second valving means, said second valving means connected to the first pressure source, said second valving means also being connected to the said fourth port of the bistable valve means, said second valving means functions to control the flow of any fluent substance, from the first pressure source to the said fourth port of the bistable valve means,
   and a signal producing means, said signal producing means connected to said fifth port of the bistable valve means, said signal producing means functions to produce a signal whenever any fluent substance flows to said signal producing means.

2. A device, according to claim 1, which will set a pneumatic or hydraulic signal should the pressure in a gas or liquid filled tube or container be decreased.

3. A device, according to claim 1, which will set a pneumatic or hydraulic signal should periodic or fluctuating pressures in a gas or liquid filled tube or container be decreased for any specific period of time.

4. A device, according to claim 1, for producing pneumatic or hydraulic signals which correlate with a portion of a periodic pressure wave in a gas or liquid filled tube or container.

5. A device, according to claim 1, of
   a first pressure source
   a second pressure source
   a pressure sensitive relay means
   a bistable valve means
   a first valving means
   a second valving means
   and a signal producing means
to produce a low pressure alarm system.

* * * * *